F. H. HASKELL.
REEL HOLDER FOR FISHING RODS.
APPLICATION FILED APR. 3, 1909.
951,731.
Patented Mar. 8, 1910.
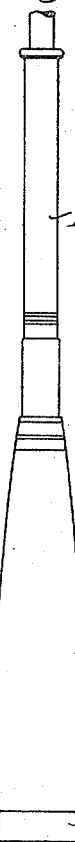
Fig. 1.
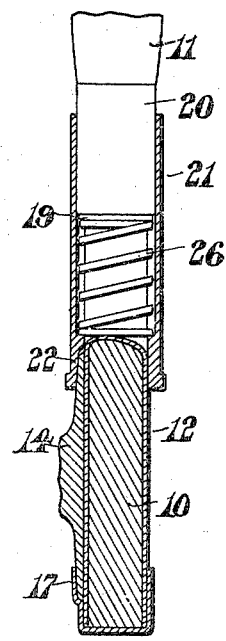
Fig. 2.
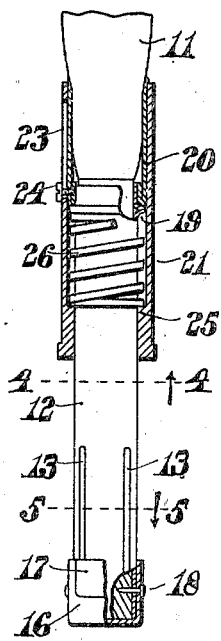
Fig. 3.
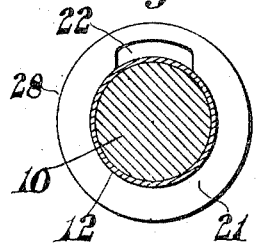
Fig. 4.
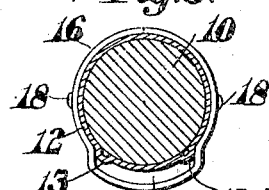
Fig. 5.
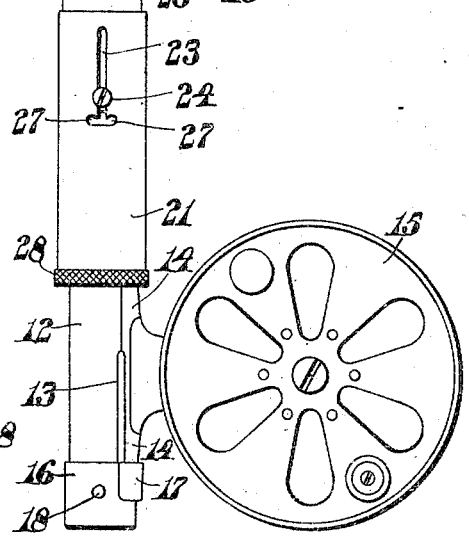
Witnesses:
Nathan C. Lombard
Howard Hanscom
Inventor:
Frank H. Haskell,
by Walter E. Lombard
Atty.

UNITED STATES PATENT OFFICE.

FRANK H. HASKELL, OF BOSTON, MASSACHUSETTS, ASSIGNOR OF ONE-THIRD TO THOMAS J. SMITH AND ONE-THIRD TO GEORGE S. GITHENS, OF DORCHESTER, MASSACHUSETTS.

REEL-HOLDER FOR FISHING-RODS.

951,731.   Specification of Letters Patent.   Patented Mar. 8, 1910.

Application filed April 3, 1909. Serial No. 487,813.

*To all whom it may concern:*

Be it known that I, FRANK H. HASKELL, a citizen of the United States of America, and a resident of Boston, in the county of Suffolk and State of Massachusetts, have invented certain new and useful Improvements in Reel-Holders for Fishing-Rods, of which the following is a specification.

This invention relates to devices for securing reels to fishing rods and retaining them firmly in position when the fishing rod is in use.

Ordinarily fishing rods are provided with a fixed ring and a sliding ring on the reel for securing the reel to the rod but when the rod is in use the sliding ring is sometimes liable to work loose, thus allowing the reel to drop off, which is obviously a great disadvantage, causing the user much annoyance while at the same time the reel is liable to be lost.

The object of the present invention is to overcome this objection and provide a means whereby the reel is more firmly secured to the reel seat of the rod than has heretofore been done.

The invention consists in certain novel features of construction and arrangement of parts which will be fully understood by reference to the description of the drawings and to the claims hereinafter given.

Of the drawings: Figure 1 represents an elevation of a portion of the butt end of a fishing rod provided with a reel securing device embodying the features of the present invention. Fig. 2 represents a section through the butt end of the rod, the movable sleeve and the reel plate, and showing the sleeve operating spring, the guide cylinder for the sleeve, and a portion of the rod in elevation. Fig. 3 represents an elevation of the butt end of the rod looking in a direction at right angles to that of Fig. 1 and showing the sleeve and its bearing cylinder in section. Fig. 4 represents a transverse section, the cutting plane being on line 4—4 on Fig. 3 looking in the direction of the arrow, and Fig. 5 represents a transverse section, the cutting plane being on line 5—5 on Fig. 3, looking in the direction of the arrow.

Similar characters designate like parts throughout the several figures of the drawings.

In the drawings, 10 represents a fishing rod provided with the usual handle 11 and having mounted upon its butt end a metal sleeve 12 provided with outwardly extending parallel ribs 13 separated the width of the reel plate 14 of a reel 15 of any usual construction. A ferrule 16 provided with a pocket 17 is secured to the end of the rod 10 by means of one or more pins 18 which pass through openings in the sleeve 12 and secure this as well as the ferrule 16 to the rod 10 in a fixed position. The opposite end of the sleeve 12 is provided with an annular rib 19 which abuts the end of a bearing sleeve 20 surrounding a portion of the handle 11 retaining said slidable bearing member 20 in fixed position.

Surrounding the cylindrical member 20 is a movable sleeve 21 provided at its lower end with a pocket 22 adapted to receive one end of the reel plate 14 while the other end is positioned within the pocket 17 of the ferrule 16.

The sleeve 20 is provided with a slot 23 extending lengthwise thereof into which a pin, screw, or other projection 24 secured to or formed upon the bearing cylinder 20 projects to prevent said sleeve from turning about its axis.

The interior of the sleeve 21 is provided with a shoulder 25 between which and the annular lip on the sleeve 12 is interposed a spiral spring 26. The lower end of the slot 23 is provided on either side with lateral notches 27 with which the pin or projection 24 is adapted to engage when the reel is not in use to lock the sleeve in raised position with the spring 26 compressed.

The lower end of the sleeve 21 is provided with an annular knurled projection 28 by which the sleeve may be readily turned about its axis a sufficient distance to cause the projection 24 to enter the notches 27 or to be moved from said notch into alinement with the slot 23 to permit the spring 26 to act upon the sleeve to force it downwardly upon the end of the reel plate 14, when this reel plate has been positioned between the ribs 13 with the opposite end of the reel plate inserted in the pocket 17 of the ferrule 16.

This provides a ready means for securing the reel to the fishing rod and positively retaining it in position while the rod is in use, thus obviating the danger of the reel being accidentally disengaged.

It is believed that the operation of the invention and its many advantages will be fully apparent from the foregoing.

Having thus described my invention, I claim:

1. In a reel holder for fishing rods, the combination of a fixed band provided with a pocket adapted to receive one end of the reel plate; a sleeve on the rod adapted to receive and inclose the opposite end thereof and lock the reel to the rod; and a spring within said sleeve and surrounding said rod for normally retaining said sleeve in locking position.

2. In a reel holder for fishing rods, the combination of a plate on said rod provided with two parallel projecting lips and an annular projection at the opposite end; a fixed socket on the end of said rod provided with a pocket adapted to receive one end of a reel plate positioned between said lips; a chambered sleeve surrounding said rod having a shoulder at its engaging end; and a spring surrounding said rod and interposed between said annular projection and the shoulder on said sleeve, the tension on said spring tending to force said sleeve onto the opposite end of said reel plate.

3. In a reel holder for fishing rods, the combination of a plate on said rod provided with two parallel projecting lips and an annular projection at the opposite end; a fixed socket on the end of said rod provided with a pocket adapted to receive one end of a reel plate positioned between said lips; a chambered sleeve surrounding said rod having a shoulder at its engaging end and a longitudinal slot having a lateral notch; a spring surrounding said rod and interposed between said annular projection and the shoulder on said sleeve, the tension on said spring tending to force said sleeve onto the opposite end of said reel plate; and a pin secured to said rod and extending through said slot adapted to engage said notch to retain the sleeve in disengaged position.

Signed by me at 4 Post Office Sq., Boston, Mass., this 31st day of March, 1909.

FRANK H. HASKELL.

Witnesses:
  WALTER E. LOMBARD,
  EDNA C. CLEVELAND.